Feb. 2, 1965  L. P. ROSELL  3,168,125
LEVER OPERATED NOZZLE
Filed Oct. 3, 1962  2 Sheets-Sheet 2
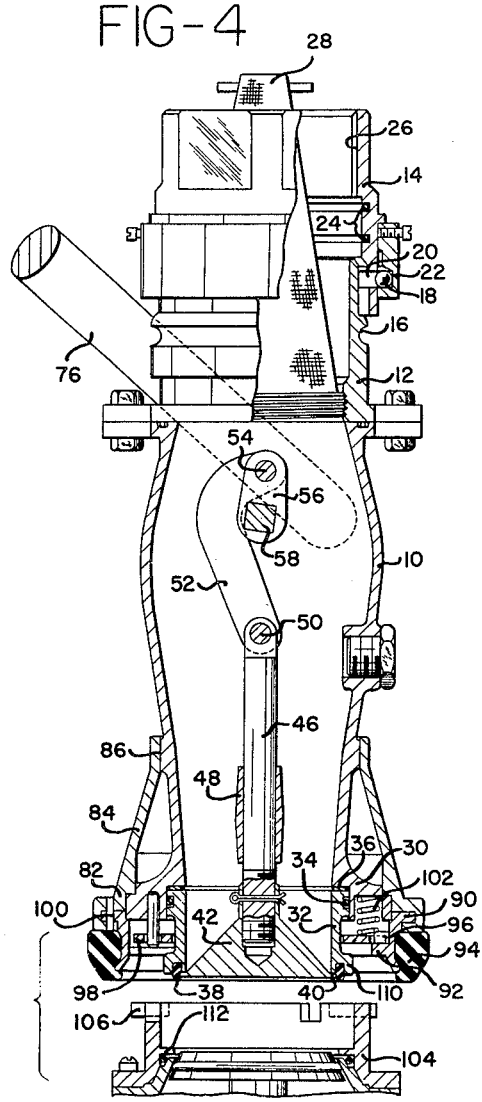
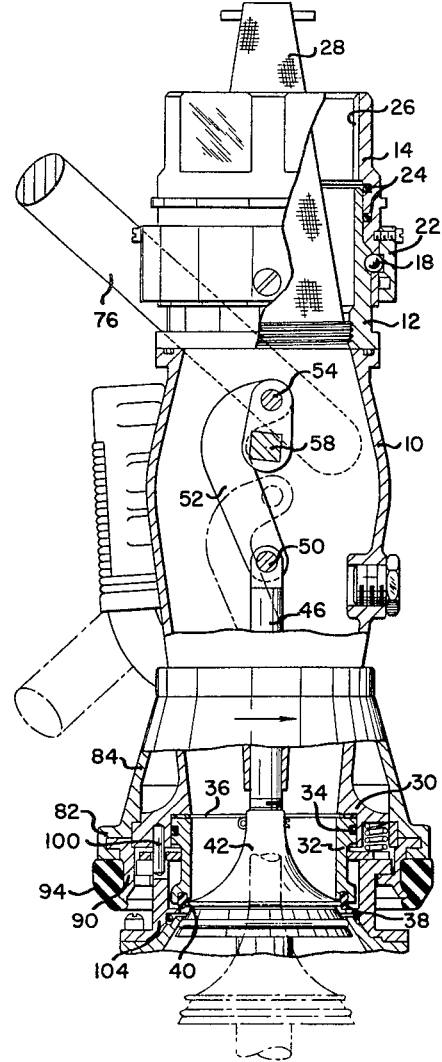
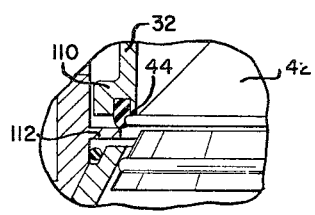
INVENTOR.
LESTER P. ROSELL
BY Toulmin & Toulmin
ATTORNEYS United States Patent Office 3,168,125
Patented Feb. 2, 1965

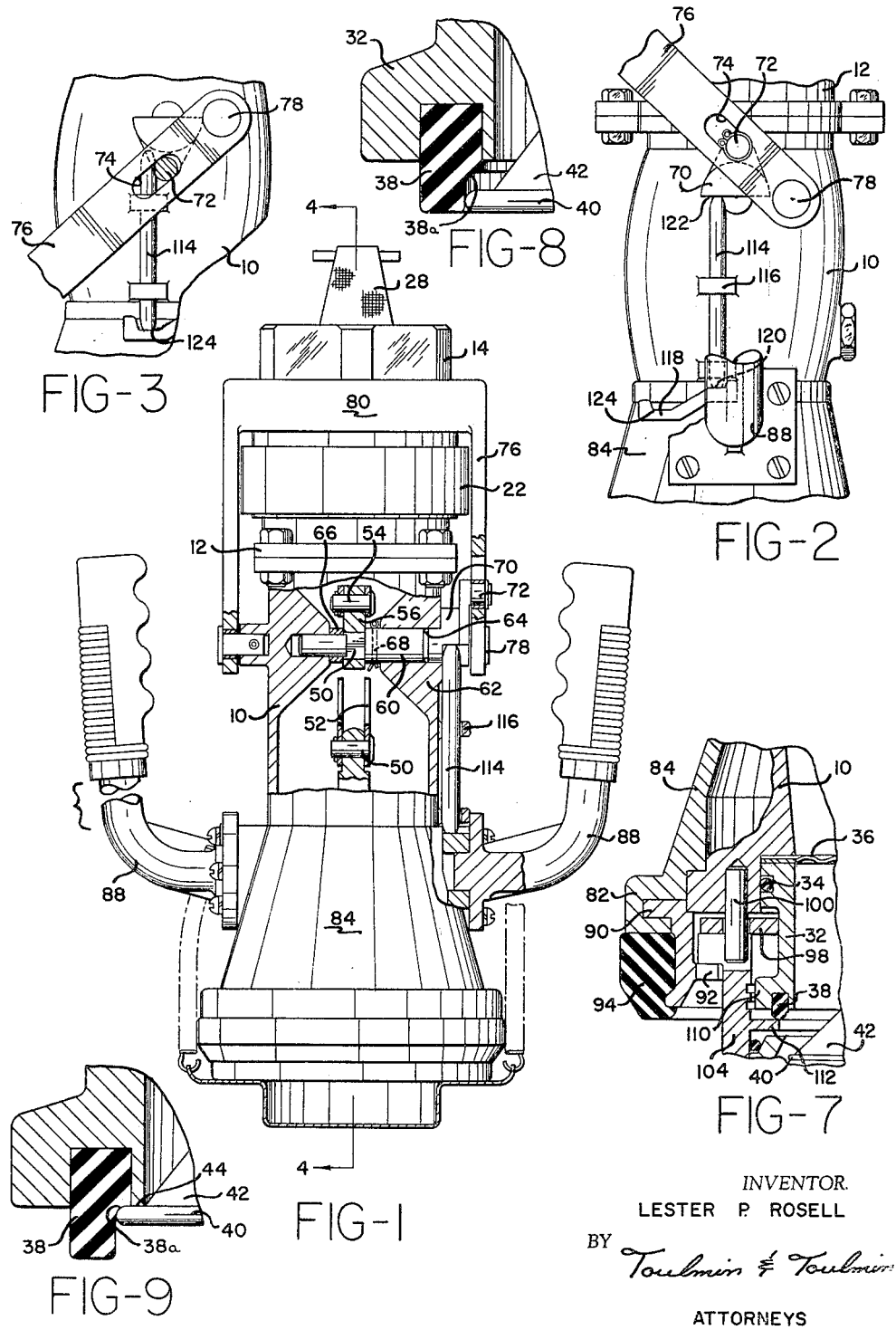

3,168,125
LEVER OPERATED NOZZLE
Lester Perry Rosell, Dayton, Ohio, assignor to Buckeye Iron & Brass Works, Dayton, Ohio, a corporation of Ohio
Filed Oct. 3, 1962, Ser. No. 228,155
6 Claims. (Cl. 141—346)

This invention relates to fluid controlling nozzles and is particularly concerned with a lever operated fuel nozzle such as is employed for connecting a fuel hose to a tank for supplying fuel thereto.

Fuel nozzles of the nature with which the present invention is concerned are employed for connecting fuel hoses to the fuel tanks of aircraft or to truck tanks or the like for supplying fuel thereto. Such nozzles must be relatively easy to manipulate in making the connection and in disconnecting the nozzles from the container being filled and it is also desirable for the nozzles to be easily operated between open and closed positions and to be absolutely fluid tight when closed.

It is still further desirable to have such nozzles so arranged that they cannot be opened unless they are connected to the container to be filled and, furthermore, so that they cannot be disconnected from a container until the nozzle is closed.

With the foregoing in mind, a primary object of the present invention is the provision of an improved nozzle construction which will meet the foregoing requirements.

Still another object of this invention is the provision of a fuel nozzle of the nature referred to which can be rapidly operated between open and closed positions.

A still further object of the present invention is the provision of an actuating mechanism for the valve member of a fuel nozzle in which the valve member latches in both its open and closed positions.

Still a further object of this invention is the provision of interlock arrangements in connection with such a fuel nozzle such that the nozzle can only be connected to a container to be filled when properly sealingly engaged therewith and the nozzle can only be opened when the nozzle is properly connected with a container.

A particular object of this invention is the provision of an improved sealing arrangement between the valve member and the valve body which has improved sealing characteristics and longer life than prior arrangements of this nature.

Another object is the provision of an improved sealing arrangement between the valve member and the valve body, wherein the seals can be replaced within a matter of minutes without disassembly of the nozzle and even without removing the nozzle from its installation.

These and other objects and advantages of this invention will become more apparent upon reference to the following specification, taken in connection with the accompanying drawings, in which:

FIGURE 1 is a view of a fuel nozzle according to this invention partially in section to show certain of the operating elements thereof;

FIGURE 2 is a view looking in from the right side of FIGURE 1 and showing the interlock mechanism pertaining to the nozzle in position to lock the nozzle closed;

FIGURE 3 is a fragmentary view similar to FIGURE 2 but shows the interlock in position to permit opening of the nozzle and with the nozzle actuating lever in its nozzle open position;

FIGURE 4 is a vertical sectional view taken through the nozzle showing the nozzle in its closed position and about to be connected to an adapter associated with the filling opening of a container;

FIGURE 5 is a view like FIGURE 4 but shows the nozzle connected to the adapter;

FIGURE 6 is a fragmentary view showing the seal arrangement by which the valve member sealingly engages the body of the nozzle when closed;

FIGURE 7 is a fragmentary view drawn at enlarged scale showing the nozzle connected to the adapter pertaining to the container to be filled and with the nozzle partly opened;

FIGURE 8 is a fragmentary sectional view showing the valve member partly supported illustrating the manner in which the periphery thereof seals against the seal ring; and FIGURE 9 is a view like FIGURE 8 but shows the valve member completely closed.

Referring to the drawings somewhat more in detail, with particular reference to FIGURES 1 and 3, the nozzle according to the present invention comprises a main body part 10 having a flow passage extending therethrough. At its upper end, as viewed from the drawings, body 10 is flanged and is connected to member 12 of a coupling assembly which also includes a rotatable member 14 adapted for connection to a hose.

Coupling member 12 has a ball race 16 therein adapted for receiving balls 18 that are carried by rotary member 14. These balls can be pressed into race 16 and at which time they are also disposed in the apertures 20 of member 14 by the positioning of ring 22 on member 14.

In FIGURE 4, the two parts of the coupling assembly are shown disassembled and, in FIGURE 5, these parts are shown assembled and at which time they are rotatably connected together. Seal ring 24 seals between members 12 and 14 and it prevents leakage from this end of the nozzle assembly.

Member 14 is internally threaded as at 26 to receive a fitting on the end of the hose to which it is to be connected. Member 12 is also internally threaded for detachably receiving screen assembly 28.

At the opposite end of body 10 is a shoulder recess 30 and to which extends the upper end of a sleeve member 32 forming a nose piece. Annular seal ring 34 seals about the sleeve member 32. One or more wave washers 36 are provided between the inner end of the nose piece and the bottom of the recess and serve to urge the nose piece outwardly of the recess which is effective for maintaining the nose piece in sealing engagement with the valve member of the nozzle as will become evident hereinafter.

The sleeve member 32 at the outer end has an annular groove therein that receives a resilient rubber-like ring 38. Ring 38 is adapted for sealingly resiliently engaging the relatively narrow rounded peripheral portion 40 of valve member 42 of the nozzle. Peripheral portion 40 extends radially from the valve member and is so arranged that when the valve member is closed portion 40 takes a bearing at 44 (see FIGURE 9) which positively locates the valve member while at the same time ring 38 tightly seals the periphery thereof. It will also be noted that the seal ring 38 has a step 38a formed therein and this step is engaged by the back face of the peripheral portion 40 of valve member 42 and effects additional sealing engagement with the seal ring when the valve member is moved to its closed position. As will be seen in FIGURE 8, this step normally projects outwardly somewhat from the end of sleeve member 32 and thus the seal ring is placed in compression when the valve member is closed, while, at the same time, the valve member is positively located by the aforementioned metal to metal engagement with the end of the sleeve.

The aforementioned wave washers 36 resiliently bias the sleeve member 32 toward the valve member 42 and thus maintain the aforementioned sealing condition even if the valve member or sleeve member wears in use.

The valve member 42 is threaded and pinned to a valve stem 46 extending axially along the flow passage through the nozzle and slideably through hub 48 of a spider or valve stem guide provided in the valve body.

At its upper end, stem 46 is pivoted by pin 50 to a pair of bent links 52 which, in turn, are pivoted by pin 54 to an operating arm 56 having a non-circular hole therein that receives the non-circular portion 58 of the actuating shaft 60 of the nozzle. Arm 56 forms a crank portion on shaft 60 within the valve body.

Shaft 60, as will be seen in FIGURE 1, is rotatably supported in boss portions 62 of the nozzle body and at one end carries a sealing ring 64 to seal the shaft to the nozzle body. A spacer 66 is provided between arm or crank portion 56 and one of boss portions 62 and a cotter pin 68 passes through the shaft on the other side of the arm thereby locking the shaft and the arm in the nozzle body.

One end of saft 60 extends from the nozzle body and has a concentric semi-circular portion 70 formed thereon and pin 72 thereon eccentric to the axis of shaft 60 and forming a crank pin.

As will be seen in FIGURES 2 and 3, pin 72 is slideably received in slot 74 of a lever 76 and which is pivoted to the nozzle body by pivot pins 78. The aforementioned connection between lever 76 and shaft 60 is such that travel of the lever 76 through an angle of about 90°, namely, from its FIGURE 2 position to its FIGURE 3 position, will move shaft 60 slightly more than 180° which will carry the pin 54 on arm or crank portion 56 from an off-center position above shaft 60 to an off-center position below shaft 60.

These two positions of pin 54 will be seen in FIGURE 5. This provides for latching of the valve member 42 in both its open and closed positions.

The lever 76, as will be seen in FIGURE 1, includes a transverse bar portion 80 so that the lever is extremely easy to manipulate between its nozzle open and nozzle closed positions.

The nozzle body 10, at its lower end, is also provided with a radially outwardly extending peripheral flange means 82 which is machined to provide one supporting surface for an annular shroud member 84 that also engages the nozzle body at 86 on another annular machined surface. The shroud is preferably a split member so that it can be assembled about the nozzle body and is rotatable on the nozzle body.

This shroud member 84, as will be seen in FIGURE 1, is provided with handle members 88 by means of which the shroud member can be rotated for connecting the nozzle to an adapter fitting and for disconnecting it therefrom.

At the lower end, the shroud member carries a lug ring 90 and which lug ring is provided with an inwardly extending flange 92 interrupted at predetermined points thereabout so as to form one part of a bayonet type connecter. The outer periphery of the lug ring carries a resilient bumper ring 94.

The lug ring has an abutment 96 projecting upwardly from the top of flange 92 which is received in a notch in an interlock ring 98. Interlock ring 98 is axially movable within the lug ring and about sleeve member 32 but is held by pin means 100 against rotation relative to nozzle body 10 while simultaneously being resiliently urged outwardly by spring means 102 disposed between body 10 and interlock ring 98.

It will be evident that the interlock ring locks shroud member 84 against rotation on nozzle body 10 until interlock ring 98 is pushed upwardly to disengage the notch therein from abutment 96 of the lug ring.

A typical adapter member to which the nozzle body is adapted for being connected is indicated at 104 and is shown in FIGURE 4 as being disconnected from the nozzle body while, in FIGURE 5, the nozzle body is shown connected to the adapter member. The adapter member has lugs 106 adapted for entering the notches in lug ring 92. The end of adapter member 104, when the said lugs enter the said notches, will push interlock ring 98 upwardly into its FIGURE 5 position at which time handles 88 can be availed of for rotating the shroud member independently of the nozzle body thereby fixedly connecting the nozzle body to the adapter member.

An important feature of the present invention resides in an interlock that prevents opening of the valve member until shroud member 84 has been turned to the position to which it attaches the nozzle to the adapter member while, at the same time, the interlock prevents movement of the shroud member to its unlocking position until the valve member is closed.

The foregoing is accomplished by a simple interlock arrangement which will be seen in FIGURES 2 and 3. In these figures, it will be seen that there is an interlock plunger 114 slideable in apertured boss means 116 provided on the nozzle body. The upper end of plunger 114 is disposed in the region of the semi-circular portion 70 of the nozzle actuating shaft 60. The lower end of interlock plunger 114 rests on a cam 118 attached to shroud member 84.

Cam member 118 has a higher portion 120 which engages the lower end of plunger 114 when the shroud member is in unlocking position. This holds plunger 114 against the flat portion 122 of semi-circular portion 70 of the nozzle actuating shaft and prevents any movement of this shaft in the opening direction from its closed position.

Upon rotating the shroud member, however, the locking pin 114 will ride down the incline 122 of the cam to the lowermost recess portion 124 of the cam and in which position the plunger 114 moves downwardly far enough to permit semi-circular portion 70 of the actuating shaft to turn freely past the upper end of the interlock plunger. It will be evident, in FIGURE 3, that the interlock plunger 114 is positively held downwardly so that the shroud member cannot be rotated away from its locking position until the valve member has been moved to its closed position. The simple arrangement provided thus provides for an absolute interlock between the valve member and the shroud member while interlock ring 98 provides an absolute interlock between the adapter member and the shroud member.

The valve is always controlled so that it forms a perfectly safe operating unit and accidental discharge of fuel therefrom is substantially impossible.

The aforedescribed sealing arrangements, particularly, with respect to the valve member 42, are particularly effective and there is no leakage from the nozzle after it has been closed.

The rotary coupling assembly referred to above permits free rotary movement of the nozzle on the end of the hose to which it is connected so that the nozzle can always be locked in the best position for manipulation without twisting or kinking the hose.

The nozzle is simple to use and is reliable in operation and operates rapidly on account of the relatively short stroke of the lever 76 that is required to move the valve member between its full open and closed positions.

A particular feature of the present invention is to be found in the ease of service of the nozzle arrangement, particularly with respect to the replacement of the seals represented by rings 34 and 38. Both of these elements can be readily replaced by depressing interlock ring 98 to disengage it from flange 92. While ring 92 is so depressed, shroud member 84 is free to rotate to a point where interlock plunger 114 will ride down the incline of cam member 118. At this time the lever 76 will be free to open valve member 42. When valve member 42 is opened, the sleeve member 32 can be pulled out from its recess thereby exposing O-ring 34 and both of rings 34 and 38 can then be replaced. Reversing of the foregoing steps can be carried out to restore the nozzle to operating condition.

It will be understood that this invention is susceptible to modification in order to adapt it to different usages and conditions; and, accordingly, it is desired to comprehend such modifications within this invention as may fall within the scope of the appended claims.

I claim:

1. In a lever operated nozzle assembly; a body having a flow passage therethrough from end to end, means at one end of the body for swivelly connecting the body to a supply conduit, a valve member closing the flow passage at the other end of the body and movable outwardly from the body to open said passage, a lever pivotally mounted on the outside of said body, a shaft connected to the lever and rotatable in the body and connected to the valve member for moving the valve member between open and closed positions, coupling means at the valve member end of the body for coupling it to the filling fitting of a receiver, a sleeve member axially slidable in said other end of the body between the valve member and the body, and sealed about its periphery to the body, means at the valve member end of the sleeve member for sealing engagement thereof by said valve member, and resilient means between the other end of the sleeve member and the valve body to maintain pressure engagement of the sleeve with the valve member when the valve member is closed, said means for sealing engagement with the valve member comprising a resilient annular ring in the end of the sleeve member, said valve member having a radial flange engageable in the region of its periphery with said resilient ring and also engageable with the end of said sleeve member, said resilient ring also being engageable with said fitting when the body is coupled thereto and said valve member is opened.

2. In a lever operated nozzle assembly; a body having a flow passage therethrough from end to end, means at one end of the body for swivelly connecting the body to a supply conduit, a valve member closing the flow passage at the other end of the body and movable outwardly from the body to open said passage, a lever pivotally mounted on said body, a shaft rotatable in the body and connected to the valve member to move it between open and closed positions, said shaft having an eccentrically located pin thereon outside the body, said lever having a slot receiving said pin so pivotal movement of the lever will rotate the shaft, and coupling means on the valve member end of the body for detachable connection thereof to the filling fitting of a receiver, said slot being located in the lever so that the average distance of the pin therein from the pivot axis of said lever is about twice the distance of the pin from the axis of the shaft whereby about 90° of pivotal movement of the lever will produce about 180° of rotary movement of the shaft to move said valve member outwardly from said body.

3. In a lever operated nozzle assembly; a body having a flow passage therethrough from end to end, means at one end of the body for swivelly connecting the body to a supply conduit, a valve member closing the flow passage at the other end of the body and movable outwardly from the body to open said passage, a lever pivotally mounted on said body, a shaft connected to the lever and rotatable in the body and connected to the valve member for moving the valve member between open and closed positions, coupling means at the valve member end of the body for coupling it to the filling fitting of a receiver, a removable sleeve member axially slidable in said other end of the body between the valve member and the body, and sealed about its periphery to the body, means at the valve member end of the sleeve member for sealing engagement thereof by said valve member, and resilient means between the other end of the sleeve member and the valve body to maintain pressure engagement of the sleeve member with the valve member when the valve member is closed, said means for sealing engagement with the valve member comprising a resilient annular ring in the end of the sleeve member, said resilient annular ring having a step formed in the end thereof engageable by the valve member when moved toward its closed position, said valve member having a radial flange at its outer periphery engageable with said step, said step being located outwardly from the end of said sleeve member, and said valve member when completely closed engaging the end of the sleeve in direct contact therewith while simultaneously compressing said resilient ring.

4. In a lever operated nozzle assembly; a body having a flow passage therethrough from end to end, means at one end of the body for swivelly connecting the body to a supply conduit, a valve member closing the flow passage at the other end of the body and movable outwardly from the body to open said passage, a lever pivotally mounted on the outside of said body, a shaft connected to the lever and rotatable in the body and connected to the valve member for moving the valve member between open and closed positions, coupling means at the valve member end of the body for coupling it to the filling fitting of a receiver, a removable sleeve member axially slidable in said other end of the body between the valve member and the body, and sealed about its periphery to the body, means at the valve member end of the sleeve member for sealing engagement thereof by said valve member, and resilient means between the other end of the sleeve member and the valve body to maintain pressure engagement of the sleeve member with the valve member when the valve member is closed, said means for sealing engagement with the valve member comprising a resilient annular ring in the end of the sleeve member, said resilient annular ring having a step formed in the end thereof engageable by the valve member when moved toward its closed position, said valve member having a radial flange at its outer periphery engageable with said step, said step being located outwardly from the end of said sleeve member, and said valve member when completely closed engaging the end of the sleeve member in direct contact therewith while simultaneously compressing said resilient ring, the extreme outer periphery of said radial flange effecting radial engagement with said annular ring whereby the seal effected between the resilient annular ring and the valve member extends a substantial distance around the surface of the said radial flange of the valve member.

5. In a lever operated nozzle assembly; a body having a flow passage therethrough from end to end, a valve member closing the flow passage at one end of the body and movable outwardly from the body to open said passage, a lever pivotally mounted on the outside of said body, a shaft operatively connected to the lever and rotatable in the body and operatively connected to the valve member for moving the valve member between open and closed positions, said body having radially outwardly extending peripheral flange means on the valve end thereof, a split shroud member rotatably supported on said flange means, said shroud member having an annular recess therein, a lug ring retained in said recess and fixed to rotate therewith and having an inwardly extending flange interrupted at predetermined points thereabout to form one part of a bayonet type connector for connection to a filling fitting of a receiver, a sleeve member axially slidable in said body between said valve member and said body at said valve end and sealed about its periphery to the body, resilient means between the other end of the sleeve member and the valve body to maintain pressure engagement of the sleeve with the valve member when the valve member is closed, means at the valve member end of said sleeve member for sealing engagement thereof by said valve member, an interlock ring axially movable within said lug ring and restrained against rotation relative to said body, said interlock ring having a notch therein and means to resiliently urge said interlock ring outwardly of said body towards said valve end, said lug ring having an abutment extending upwardly from said flange towards the center of said body and adapted to engage said notch on said interlock ring to thereby maintain said lug ring and said shroud member in a first position on said body, said shroud member being adaptable to be rotated to a second position on said body when said interlock ring is pushed inwardly of said body to disengage said notch from said projection, and cooperating means between said shroud member and said lever to prevent said lever from opening said valve while said shroud member is in said first position and to prevent said shroud member from being returned to said first position from said second position until said lever closes said valve.

6. The nozzle assembly as claimed in claim 5 in which said cooperating means comprises; a plunger slidably mounted on the exterior of said body, a first cam member attached to the exterior of said shroud member and having a lower portion interconnected with a higher portion with said higher portion being closer to said lever, and a semi-circular cam member having an arcuate portion and a flat face and secured to rotate with said shaft on the outside of said body and also having a crank pin thereon, said lever having one end pivotally mounted on the outside of said body and having an elongated recess between the ends thereof adapted to slidably receive said crank pin, said plunger having a lower end engaging the the higher portion of said first cam member and the upper end engaging said semi-circular cam member so that the upper end of the plunger engages said flat face to prevent rotation of said shaft to open said valve while said shroud member is in said first position, said upper end of said plunger engaging the said arcuate portion and the lower end of the plunger engaging the lower portion of the first cam to prevent rotation of said shroud member while in said second position while permitting said valve member to be closed.

References Cited by the Examiner
UNITED STATES PATENTS

| | | | |
|---|---|---|---|
| 2,519,358 | 8/50 | Davies | 137—614.06 XR |
| 2,653,832 | 9/53 | Carter | 141—346 XR |
| 2,679,407 | 5/54 | Badger | 137—614.06 XR |
| 2,680,030 | 6/54 | Hoelzer | 137—614.06 XR |
| 2,737,401 | 3/56 | Lindsay. | |
| 3,034,544 | 5/62 | Griswold | 141—346 |
| 3,045,721 | 7/62 | Shepherd et al. | 141—346 |

FOREIGN PATENTS 513,013    10/39    Great Britain.

LAVERNE D. GEIGER, *Primary Examiner.*